Nov. 14, 1967        A. C. MAGUIRE        3,352,514
JET PROPELLED AIRCRAFT WITH VARIABLE AREA JET NOZZLE
Filed Jan. 26, 1966        2 Sheets-Sheet 1
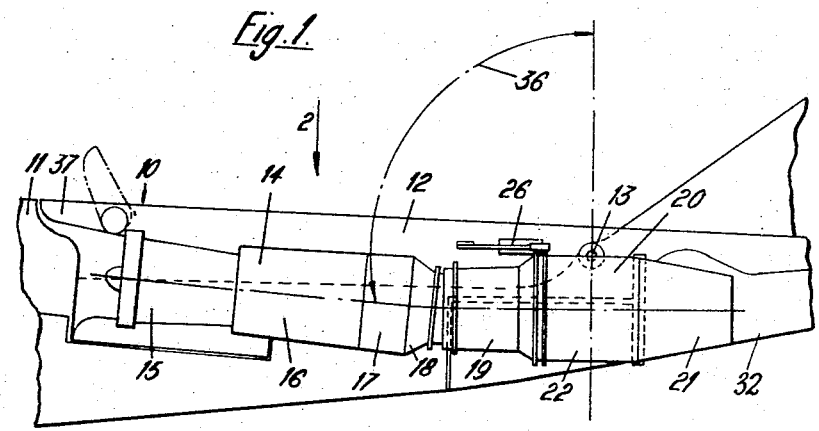
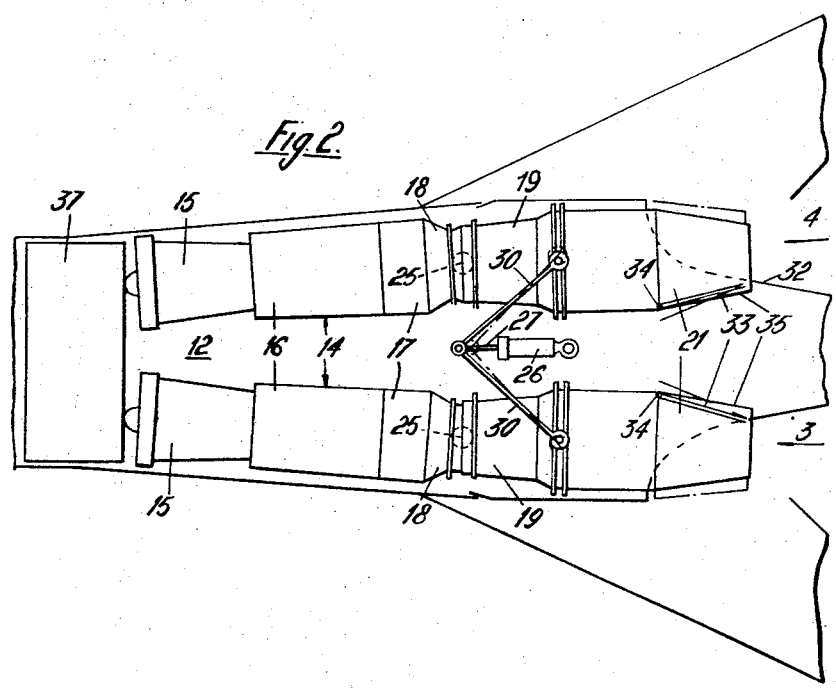
Inventor
Addison Charles Maguire
Cushman, Darby - By Cushman
Attorneys Nov. 14, 1967  A. C. MAGUIRE  3,352,514
JET PROPELLED AIRCRAFT WITH VARIABLE AREA JET NOZZLE
Filed Jan. 26, 1966  2 Sheets-Sheet 2

Inventor
Addison Charles Maguire
Cushman, Darby & Cushman
By
Attorneys

United States Patent Office 3,352,514
Patented Nov. 14, 1967

3,352,514
JET PROPELLED AIRCRAFT WITH VARIABLE AREA JET NOZZLE
Addison Charles Maguire, Alvaston, Derby, England, assignor to Rolls-Royce Limited, Derby, England, a British company
Filed Jan. 26, 1966, Ser. No. 523,134
Claims priority, application Great Britain, Feb. 19, 1965, 7,407/65
13 Claims. (Cl. 244—56)

ABSTRACT OF THE DISCLOSURE

An aircraft having a jet propulsion engine which may be swung from a horizontal forward propulsion position into a vertical direct lift position, the effective area of the engine exhaust nozzle being variable in the forward propulsion position by moving the nozzle laterally with respect to a fixed aircraft surface to vary the extent to which the nozzle outlet is occluded thereby.

This invention concerns an aircraft.

According to the present invention there is provided an aircraft provided with at least one jet engine whose outlet nozzle is disposed adjacent a surface on the aircraft structure so that the effective area of the nozzle is determined by the position of the nozzle with respect to the said surface, and means for moving said nozzle towards and away from said surface so as respectively to decrease and increase the effective area of the said nozzle.

The arrangement is preferably such that base drag is reduced when the nozzle has been moved towards said surface.

The said surface is preferably provided on the aircraft fuselage or on structure connected thereto.

The fuselage may be provided with one or more recesses into which the nozzle is retracted when the latter is moved towards the said surface, and in this case the nozzle may be of circular cross-section.

Alternatively, the nozzle may be of C section and is thus provided with an opening in its wall, the said opening being closed by the said surface or by means adapted to bear against the said surface. The arrangement may in this case be such that, when the nozzle has been moved towards the said surface the said surface is disposed within the nozzle. The nozzle may, moreover, in this case be provided with a pivoted flap which is adapted to close the said opening and which is resiliently urged outwardly towards the said surface, the flap being adapted to act as a heat shield.

The nozzle may be mounted for pivotal movement with respect to said surface.

The nozzle may, moreover, be mounted for movement with respect to the upstream part of the engine.

The engine may be provided with reheat combustion equipment.

The said engine is preferably mounted on the aircraft so that it may be moved between a horizontal and a vertical position.

There may be two said engines, common power means being provided for moving the nozzles of the two engines pivotally towards and away from each other.

Figure 4:
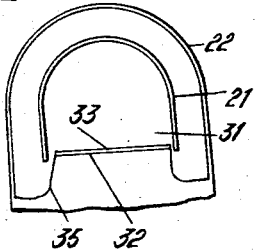
Figure 3:
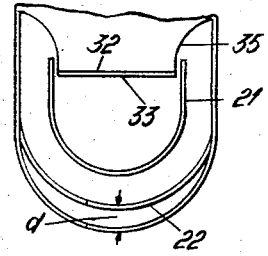
Figure 5:
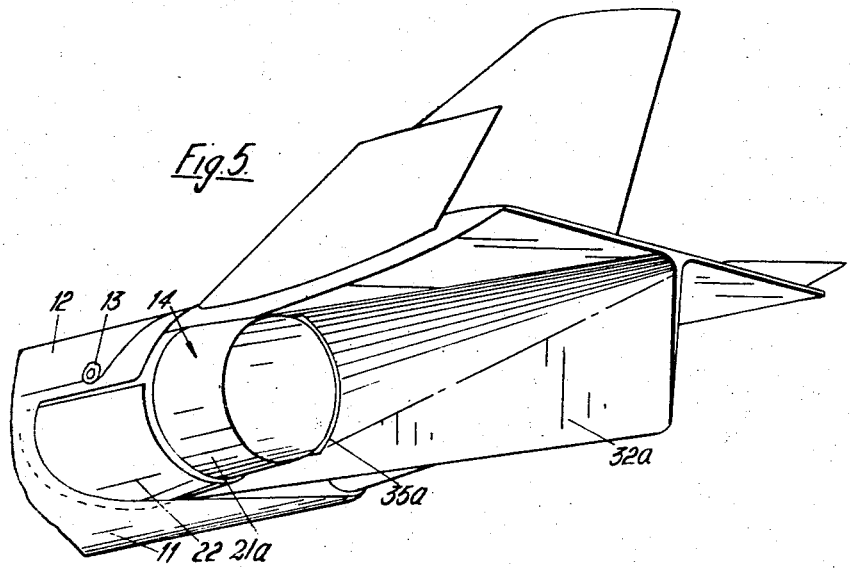
Figure 6:
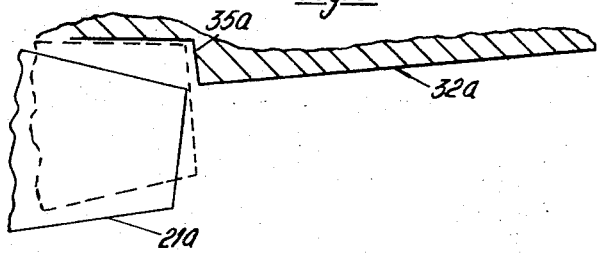

The invention is illustrated, merely by way of example, in the accompanying diagrammatic drawings, in which:

FIGURE 1 is a broken-away elevation of part of an aircraft according to the present invention, FIGURE 2 is a broken-away underneath plan view of the aircraft of FIGURE 1, FIGURES 3 and 4 are broken-away views taken in the directions of the arrows 3 and 4 respectively of FIGURE 2, and FIGURES 5 and 6 are respectively a diagrammatic perspective view and a diagrammatic underneath plan view of part of another aircraft according to the present invention.

In FIGURES 1 and 2 there is shown a supersonic aircraft 10 having a fuselage 11 a portion 12 of which is mounted on pivots 13, which are spaced transversely of the fuselage. Mounted beneath and carried by the fuselage portion 12 are two gas turbine jet engines 14. Each of the engines 14 comprises in flow series one or more compressors 15, main combustion equipment 16, one or more turbines 17, an exhaust duct 18, a jet pipe 19, reheat combustion equipment 20, and a jet outlet nozzle 21 which is mounted within a nacelle 22.

The jet pipe 19, reheat combustion equipment 20, nozzle 21 and nacelle 22 of each engine together from a unit which is mounted for pivotal movement about a pivot 25 so that it may be pivoted with respect to the upstream part of the engine, i.e. with respect to the compressor or compressors 15, main combustion equipment 16, turbine or turbines 17, and exhaust duct 18.

A common ram 26 is provided for effecting such pivotal movement of the nozzles 21 towards and away from each other, the ram 26 having a rod 27 which is connected to the engines 14 by way of push rods 30.

The nozzle 21 of each of the engines 14 is of C-section and is thus provided with an opening 31 in its wall (see FIGURES 3 and 4). The nozzles 21 are disposed adjacent to jet expansion surfaces 32 on the fuselage 11, the arrangement being such that the effective areas of the nozzles 21 is determined by the positions of the nozzles 21 with respect to the said surfaces 32. Each of the nozzles 21 may thus be moved towards and away from its respective surface 32, i.e. it may be moved between a minimum area position in which, as shown in FIGURE 3, the surface 32 is disposed within the nozzle 21, and a maximum area position in which, as shown in FIGURE 4, the surface 32 is not so disposed.

Each of the nozzles 21 is provided with a flap 33 which is pivoted at its upstream end 34 and whose downstream end is resiliently urged outwardly (by means not shown) towards the respective surface 32. The flap 33 thus bears against the respective surface 32 and closes the opening 31, whereby the flap 33 acts as a heat shield which protects the respective surface 32 from being subjected to the exhaust gases prior to the latter being mixed with the ambient air.

The fuselage 11 is provided with recesses 35 into which the nozzles 21 are retracted when the latter are moved towards the surfaces 32.

Accordingly, when the reheat combustion equipment 20 is to be used, the ram 26 may be employed to move the nozzles 21 pivotally away from the surfaces 32 so as to increase their effective areas, while when the use of the reheat combustion equipment 20 ceases, the ram 26 may be employed to move the nozzles 21 pivotally towards the surfaces 32 so as to decrease their effective areas.

Thus, when reheat is not in use, the nozzles 21 will be moved in towards the fuselage 11 so that their nacelles 22 are moved inwardly by a distance $d$ (see FIG. 3), whereby to reduce base drag. Accordingly base drag may be reduced when the aircraft 10 is moving at transonic speeds.

The fuselage portion 12 may, as indicated by arrow 36 in FIGURE 1, be moved (by means not shown) between the horizontal position shown in FIGURE 1 and a vertical position (not shown) in which the engines 14 carried thereby direct their thrusts downwardly. The fuselage portion 12, moreover, is provided with air inlet flap 37 which is pivoted at 38 and which, during forward flight, may be raised to the dotted position shown in FIGURE 1 so as to permit air to enter the intakes of the engines 14.

In FIGURES 5 and 6 there is shown a modification of the invention which is generally similar in combustion to that of FIGURES 1–4 and which will not therefore be described in detail. In the construction of FIGURES 5 and 6, however, the engines 14 are provided with nozzles 21a which are fully circular in cross section. Expansion surfaces 32a are employed each of which is provided with a recess or step 35a into which the respective nozzle 21a may be retracted.

I claim:
1. An aircraft provided with at least one jet engine having an outlet nozzle of C-section, so that the wall of the nozzle has a lateral opening therein, the aircraft having a surface adjacent the nozzle which closes the opening in the nozzle wall so that the effective area of the nozzle is determined by the position of the nozzle with respect to the said surface, and means for moving said nozzle towards and away from said surface respectively to decrease and increase the effective area of the said nozzle.

2. An aircraft as claimed in claim 1 in which the base drag is reduced when the nozzle has been moved towards said surface.

3. An aircraft as claimed in claim 1 in which the said surface is provided on the aircraft fuselage.

4. An aircraft as claimed in claim 1 in which, when the nozzle has been moved towards the said surface, the said surface is disposed within the nozzle.

5. An aircraft as claimed in claim 1 in which the nozzle is provided with a pivoted flap which is adapted to close the said opening and which is resiliently urged outwardly towards the said surface, the flap being adapted to act as a heat shield.

6. An aircraft as claimed in claim 1 in which the nozzle is mounted for pivotal movement with respect to said surface.

7. An aircraft as claimed in claim 1 in which the nozzle is mounted for movement with respect to the upstream part of the engine.

8. An aircraft as claimed in claim 1 in which the said engine is provided with reheat combustion equipment.

9. An aircraft as claimed in claim 1 in which there are two said engines, each engine having a pivotable portion including the respective outlet nozzle which is pivotable about a pivot axis extending substantially parallel to the yaw axis of the aircraft at the upstream end of the pivotable portion, common power means being provided for moving the nozzles of the two engines pivotally towards and away from each other.

10. An aircraft provided with at least one jet engine, means including a generally horizontal pivotal axis extending transversely of the aircraft's longitudinal axis for moving the engine as a unit relative to the aircraft between a forward propulsion position in which it directs jet exhaust gases rearwardly of the aircraft and a direct lift position in which it directs jet exhaust gases substantially parallel to the yaw axis of the aircraft, said engine having an exhaust gas outlet nozzle and the aircraft having a surface disposed adjacent the nozzle when the engine is in its forward propulsion position so that the effective area of the nozzle is determined by the position of the nozzle with respect to the said surface, and means including a second pivotal axis extending generally parallel to the yaw axis of the aircraft for moving said nozzle relative to the remainder of said engine towards and away from said surface.

11. An aircraft as claimed in claim 10 in which the fuselage is provided with at least one recess into which the nozzle is retracted when the latter is moved towards the said surface.

12. An aircraft as claimed in claim 10 in which the nozzle is C-section having a lateral opening in its wall, the said opening being closed by the said surface.

13. An aircraft as claimed in claim 11 in which the nozzle is of circular cross section.

References Cited
UNITED STATES PATENTS

| | | | |
|---|---|---|---|
| 2,986,877 | 6/1961 | Emmons et al. | 60—224 |
| 3,271,948 | 9/1966 | Fuller | 60—271 X |

CARLTON R. CROYLE, *Primary Examiner.*